United States Patent [19]

Peterson

[11] Patent Number: 4,637,344
[45] Date of Patent: Jan. 20, 1987

[54] BIRD FEEDER

[75] Inventor: Luetta M. Peterson, Kankakee, Ill.

[73] Assignee: Mainstay, Inc., Gilman, Ill.

[21] Appl. No.: 784,795

[22] Filed: Oct. 4, 1985

[51] Int. Cl.[4] ............................................. A01K 39/01
[52] U.S. Cl. ................................................. 119/52 R
[58] Field of Search ..................... 119/51 R, 52 R, 23

[56] References Cited
U.S. PATENT DOCUMENTS

| | | | |
|---|---|---|---|
| 1,954,286 | 4/1934 | Dercum | 119/51 R |
| 2,636,474 | 4/1953 | Parker | 119/51 R |
| 2,673,551 | 3/1954 | McAnly | 119/52 R |
| 2,682,255 | 6/1954 | Kleeman | 119/51 R |
| 2,707,454 | 5/1955 | Wilkinson | 119/51 R |
| 2,826,171 | 3/1958 | Piel | 119/52 R |
| 2,918,901 | 12/1959 | Poulsen | 119/51 R |
| 3,086,499 | 4/1963 | Dilley | 119/51 R |
| 3,645,235 | 2/1972 | Suchla | 119/51 R |
| 4,462,337 | 7/1984 | Kilham | 119/51 R |

Primary Examiner—Robert P. Swiatek
Attorney, Agent, or Firm—Lloyd L. Zickert

[57] ABSTRACT

A bird feeder rotatably mounted for responding to the wind and having on one side a feeding area shielded so as that as the feeder turns in the wind the feed side will always be protected by the wind. The housing of the feeder is shaped so that it rotates in response to the wind and positions the feed side away from the wind to not only protect the feeding birds, but also to prevent the wind from blowing seed from the housing.

9 Claims, 6 Drawing Figures

U.S. Patent  Jan. 20, 1987  4,637,344
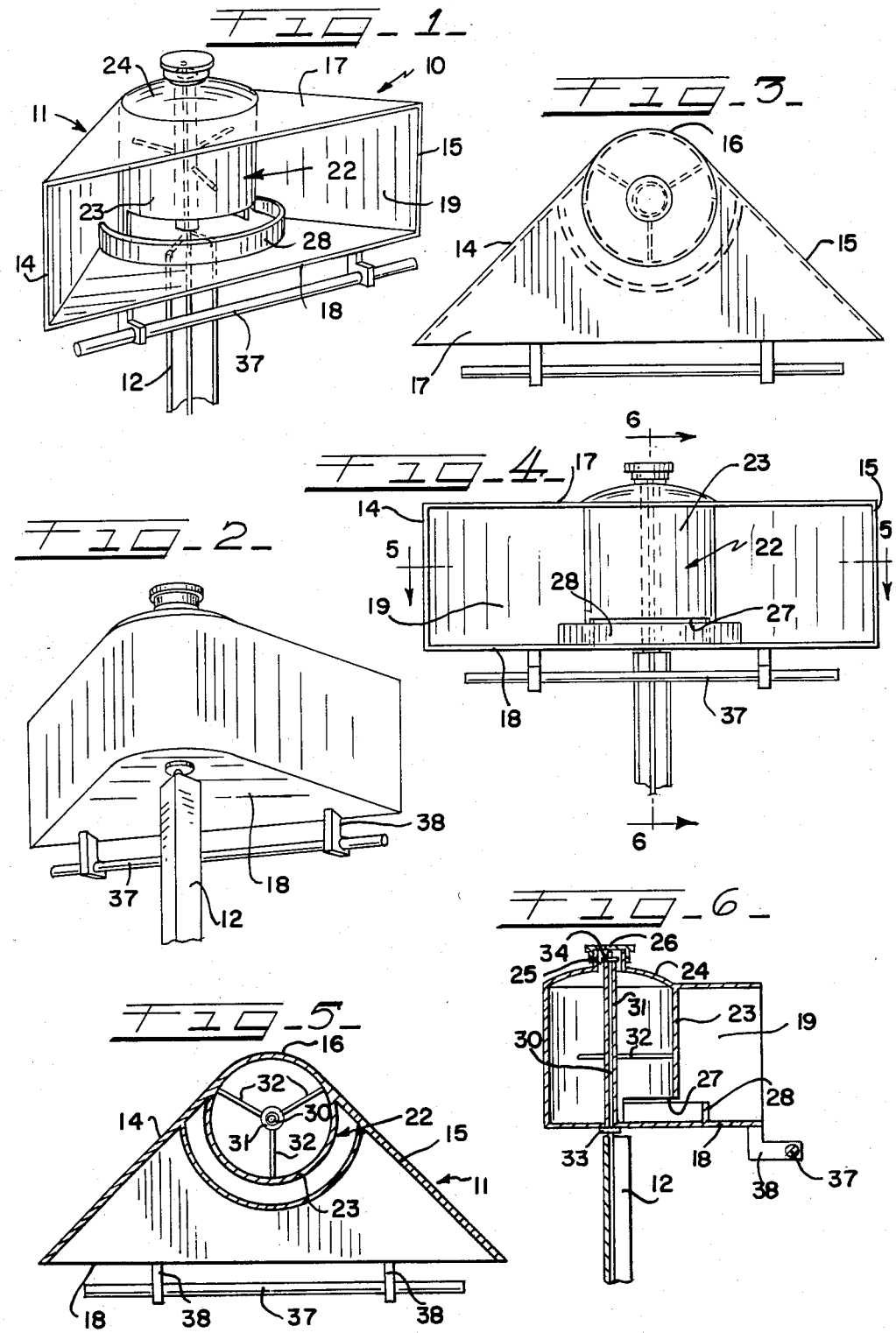

BIRD FEEDER

DESCRIPTION

This invention relates in general to a bird feeder, and more particularly to a bird feeder that includes a bird feeding area that is always protected from the wind to not only protect feeding birds but also to prevent loss of bird feed, and still more particularly to a bird feeder rotatably mounted on a shaft and having a housing that is shaped to respond to the wind forces and always position the feeding area away from the wind.

BACKGROUND OF THE INVENTION

Heretofore, it has been known to provide bird feeders that are constructed to be rotatable in response to wind forces and maintain the feed areas on the leeward side, such as in U.S. Pat. No. 2,707,454. However, this bird feeder and other bird feeders have always depended upon wind vanes connected to the bird feeder housing for responding to the wind to rotate the bird feeder. Once the vanes become removed, accidentally or otherwise, the bird feeder will no longer operate properly to maintain the bird feeding area on the leeward side of the wind.

It is important to provide a bird feeder that will function properly at all times to not only protect the birds when they are feeding but also to prevent the wind from blowing seed out of the feeder and thereby wasting feed.

SUMMARY OF THE INVENTION

The present invention obviates the difficulties heretofore known in prior bird feeders by providing a bird feeder that will not only respond to the wind forces and prevent the loss of bird feed as well as preventing the bird feed from being contaminated by the weather, but also to protect the birds against inclement weather when they are feeding. The feeder includes a housing that is bearingly mounted on a shaft and shaped to define a substantially enclosed feeding area and so that it is responsive to the wind forces to always position the entrance and feeding area of the feeder away from the wind. This allows birds to enter and be completely protected by the wind, and it also prevents feed from being blown from the feeder and the feed from being damaged by rain or snow. The feeding area is sized to also protect the birds and feed from overhead weather elements.

The housing is in the shape of a horn where the open end constitutes the entrance and bird feeding area. At the base of the horn a seed or feed reservoir contains a supply of seed and is provided with a slot at its lower end for allowing feed to be dispensed by gravitational flow. In order to prevent the feed from continuing to flow, a retaining wall is positioned opposite the feed slot thereby defining with the feed slot a trough area into which the bird feed is collected and from which the birds consume the feed. The feeder is mounted so that the pivot point is offset from the center of the housing thereby assuring that the housing shape will respond to the wind forces and rotate the housing to always maintain the entrance to the feeder away from the wind.

It is therefore an object of the present invention to provide a new and improved bird feeder that will directionally rotate in response to wind forces and provide a feeder that is much more economical as far as use of bird feed by preventing feed from blowing out of the feeder and also preventing the feed from being subjected to moisture from rain or snow.

Another object of the present invention is in the provision of a bird feeder responsive to wind forces to rotate and protect the bird feeding area and birds while they are feeding and also to eliminate a wind chill factor to the birds during the feeding operation.

Other objects, features and advantages of the invention will be apparent from the following detailed disclosure, taken in conjunction with the accompanying sheet of drawing, wherein like reference numerals refer to like parts, in which:

BRIEF DESCRIPTION OF THE DRAWINGS

FIG. 1 is a front perspective view of the bird feeder of the invention looking at it from the bird feeding entrance and showing some parts in phantom for purposes of clarity;

FIG. 2 is a perspective view looking at the back side of the feeder or the wind side;

FIG. 3 is a top plan view of the feeder with some parts shown in dotted lines for purposes of clarity;

FIG. 4 is a front elevational view of the bird feeder showing the bird feeding entrance;

FIG. 5 is a horizontal sectional view taken through the bird feeder and particularly along line 5—5 of FIG. 4; and FIG. 6 is a vertical sectional view taken through the bird feeder and particularly along line 6—6 of FIG. 4.

DESCRIPTION OF THE INVENTION

Referring now to the drawings and particularly to FIGS. 1 to 4, the bird feeder of the invention, generally designated by the number 10, includes a horn-shaped housing 11 rotatably mounted on a support member 12 that is suitably in turn mounted on a post or other ground supported member to preferably mount the bird feeder at a suitable level above ground so that it will be attractive to birds. The housing 11 is shaped and constructed so that it will rotate directionally in response to wind forces to shelter the bird feed and to shelter feeding birds.

The housing 11 is made of a suitable material, and includes a pair of upstanding diverging walls 14 and 15 connected together at their converging ends by curved wall portion 16 although they may be connected to each other directly to form a pointed end if desired. The housing also includes top and bottom walls 17 and 18 which, together with the diverging walls 14 and 15, define at the end opposite the connecting ends of the diverging walls an opening 19 into which the birds enter for purposes of feeding.

A feed reservoir or hopper 22 is disposed at the base of the horn-shaped housing and defined by the forward curved wall 16 and internal curved wall 23 to form a cylindrical container. The bottom wall of the container is the bottom wall 18 of the housing and the top wall is a dome-shaped panel 24 having a filler tube opening 25 closable by a cap 26. A feed discharge slot 27 is cut into the lower end of the curved wall 23 to allow gravitational flow discharge of bird feed from the reservoir. An upstanding curved retaining wall 28 extends between the diverging walls 14 and 15 and is spaced away from the feed discharge slot a sufficient distance to allow feed to flow down through the slot to the retaining wall and expose an ample supply of feed for the birds to eat at all times. The retaining wall 28 is curved on the same radius as the curved wall 23 so that it is uniformly spaced at all points from the open feed discharge slot. It is also of a sufficient height which is substantially the height of the slot as it extends upwardly from the bottom wall 18 to provide an appropriate amount of feed exposed for the birds to eat.

Thus, bird feed, such as an appropriate bird seed, would be loaded into the container through the filler opening 25 when the cap is removed and discharged at the lower end of the hopper through the feed discharge slot as the feed is consumed by the birds to provide a continuous supply of feed until the supply of feed in the hopper is exhausted.

The bird feeder housing is rotatably supported by a vertically extending shaft 30 which is suitably connected to the support member 12. The shaft is received in a vertically extending tubular bearing member 31 extending centrally upwardly through the feed reservoir 22. The sleeve bearing is supported at its lower end by being integrally formed with the lower wall 18 and further supported within the feed reservoir and thereby stabilized at its upper end by means of radially extending support arms 32. It will be appreciated that any number of support arms may be provided for stabilizing the sleeve bearing within the feed reservoir. It may further be seen that the sleeve bearing extends substantially centrally through the feed reservoir, although it may be otherwise positioned relative to the reservoir. The use of a sleeve bearing prevents contamination by the seed which would tend to cause the bearing to malfunction. Preferably since the weight of the feed in the reservoir will be substantial when the hopper is filled, the sleeve bearing and shaft position, being centrally of the feed reservoir, provides good balance for the housing. A collar 33 is connected to the shaft and on which the housing rests at its lower end while a washer 34 may be provided at the upper end of the shaft against the top end of the sleeve bearing and where then a cotter pin (not shown) may be attached to the shaft in a suitable fashion to lock the bird feeder to the shaft. It may thereafter be understood that the bird feeder may be easily removed from the shaft for servicing by removing the cotter pin and upper washer and sliding the housing vertically upwardly off the shaft.

A perch 37 is suitably mounted to the front end of the bird feeder at the opening 19 and particularly to the lower wall 18 by means of support members 38. The perch is situated slightly below the lower wall 18 and outwardly therefrom so that when birds approach the bird feeder, they may initially sit on the perch and look inside of the bird feeder before entering it for feeding purposes.

In operation the feed hopper is suitably loaded with a supply of bird seed by loading through the filler opening 25. Thereafter, the cap 26 closes the filler opening to protect the feed against inclement weather. It will be appreciated that the filler cap 26 may be frictionally fitted to the filler tube although it may otherwise be suitably fastened to the hopper if desired. Because the shaft 30 is offset from the center of the housing 11 which is formed to respond to wind forces, when the wind forces strike the diverging walls 14 and 15, it will directionally rotate the bird feeder housing so that the opening 19 is always opposite the wind or on the leeward side. A feeding bird enters the housing and stands on the floor defined by the lower wall 18 while feeding in the area between the retaining wall and the slot. Accordingly, the birds feeding in the housing are sheltered from the wind and weather. Additionally, the bird feed is sheltered from the inclement weather and will not blow out of the housing. Further, the feed will stay dry as it will be sheltered from any moisture. This will save in the amount of bird feed needed to be supplied to the feeder and prevent waste. It, therefore, may be appreciated that the feeder of the invention will not only conserve bird feed, but will also provide shelter for the birds during feeding as they will move directly into the housing to eat the feed from the area between the hopper and the retaining wall 28.

It will be understood that modifications and variations may be effected without departing from the scope of the novel concepts of the present invention, but it is understood that this application is to be limited only by the scope of the appended claims.

The invention is hereby claimed as follows:

1. A bird feeder comprising, a horn-shaped housing having upstanding connected diverging walls, top and bottom walls, and an opening at the side opposite the connection of the diverging walls, a feed reservoir within the housing including a feed discharge slot therein at the lower end facing said opening, a retaining wall opposite said feed discharge slot to contain the flow of feed from the slot, said wall being in spaced relation to the opening such that said wall is inset within said housing, a vertically disposed shaft adapted to be supported to dispose the feeder above ground level for rotatably mounting the feeder, said shaft having a portion extending upwardly substantially throughout the feed reservoir and including a tubular bearing member surrounding said shaft portion, whereby the upstanding diverging walls function to respond to the wind and directionally rotate the feeder on the shaft so that the opening is away from the wind to shelter birds feeding at the discharge slot and also to protect the feed against inclement weather and from blowing out of the feeder.

2. The bird feeder of claim 1, wherein the shaft supporting the feeder is offset from the center of the housing toward the connection of the diverging walls.

3. The bird feeder of claim 1, wherein the reservoir is disposed adjacent the connection of the diverging walls and in spaced relation to the opening.

4. The bird feeder of claim 3, which further includes a perch mounted at the opening of the housing.

5. The bird feeder of claim 3, wherein the feed discharge slot is at the bottom wall of the housing.

6. The bird feeder of claim 3, wherein the shaft supporting the feeder is offset from the center of the housing toward the connection of the diverging walls.

7. The bird feeder of claim 1, wherein the retaining wall is of a height to prevent unrestrained flow of feed through said feed discharge slot.

8. The bird feeder of claim 7, wherein the retaining wall height is substantially equal to the height of the feed discharge slot.

9. The bird feeder of claim 1, wherein the feed reservoir includes a filler opening at its upper end for loading the reservoir with bird feed.

* * * * *